(12) United States Patent
Subramaniam et al.

(10) Patent No.: US 7,174,514 B2
(45) Date of Patent: Feb. 6, 2007

(54) ENGINE TO PRESENT A USER INTERFACE BASED ON A LOGICAL STRUCTURE, SUCH AS ONE FOR A CUSTOMER RELATIONSHIP MANAGEMENT SYSTEM, ACROSS A WEB SITE

(75) Inventors: Pavitra Subramaniam, Alameda, CA (US); Robert H. Wang, Palo Alto, CA (US); Matthew S. Malden, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 635 days.

(21) Appl. No.: 09/820,333

(22) Filed: Mar. 28, 2001

(65) Prior Publication Data

US 2002/0140731 A1    Oct. 3, 2002

(51) Int. Cl.
  *G06F 3/00* (2006.01)
(52) U.S. Cl. ..................... 715/749; 715/748; 715/968; 715/744; 715/747; 715/708
(58) Field of Classification Search ............... 345/853, 345/854; 715/604, 611, 650, 853, 854, 748, 715/749, 968, 744, 747, 705, 708, 704; 707/103, 707/104; 709/229
See application file for complete search history.

(56) References Cited

U.S. PATENT DOCUMENTS

| | | | |
|---|---|---|---|
| 4,730,270 A | 3/1988 | Okajima et al. | |
| 5,341,469 A | 8/1994 | Rossberg et al. | |
| 5,566,330 A | 10/1996 | Sheffield | |
| 5,734,887 A * | 3/1998 | Kingberg et al. | ........... 345/853 |
| 5,745,882 A | 4/1998 | Bixler et al. | |
| 5,802,493 A | 9/1998 | Sheflott et al. | |
| 5,826,240 A | 10/1998 | Brockman et al. | |
| 5,850,221 A | 12/1998 | Macrae et al. | |
| 5,854,927 A | 12/1998 | Gelissen | |
| 5,878,423 A | 3/1999 | Anderson et al. | |
| 5,933,816 A | 8/1999 | Zeanah et al. | |
| 5,973,695 A | 10/1999 | Walsh et al. | |

(Continued)

FOREIGN PATENT DOCUMENTS

| | | |
|---|---|---|
| WO | WO 00/33226 A1 | 6/2000 |
| WO | WO 02/41097 A2 | 5/2002 |
| WO | PCTUS02/22279 | 3/2003 |

OTHER PUBLICATIONS

U.S. Appl. No. 60/187,472.*

(Continued)

*Primary Examiner*—Weilun Lo
*Assistant Examiner*—Mylinh Tran
(74) *Attorney, Agent, or Firm*—Campbell Stephenson Ascolese LLP

(57) ABSTRACT

A flowchart-based tool can be used to build a logical structure. In the context of a customer relationship management (CRM) system, the logical structure can comprise an ordered set of questions and branching logic that are presented to a customer of the business when the customer contacts the business with an inquiry, such as for a sale or service inquiry or other interaction. An engine can run a session associated with the logical structure, with the session presenting questions, text, graphics, and the like dynamically to customer across a network, such as the Internet and a web site. Branching logic determines the appropriate information to present to the user based on answers to previous questions. The engine allows presentation of the information to the user/customer, by generating hypertext markup language (HTML) files to display the questions or other elements of the logical structure as part of a user interface on a client terminal of the customer.

18 Claims, 11 Drawing Sheets

U.S. PATENT DOCUMENTS

| | | | |
|---|---|---|---|
| 5,973,696 | A | 10/1999 | Agranat et al. |
| 6,012,067 | A * | 1/2000 | Sarkar ........................ 707/103 |
| 6,038,668 | A | 3/2000 | Chipman et al. |
| 6,055,369 | A | 4/2000 | Sawahata et al. |
| 6,131,085 | A | 10/2000 | Rossides |
| 6,182,092 | B1 | 1/2001 | Francis et al. |
| 6,182,095 | B1 | 1/2001 | Leymaster et al. |
| 6,256,620 | B1 | 7/2001 | Jawahar et al. |
| 6,275,977 | B1 * | 8/2001 | Nagai et al. .................... 717/1 |
| 6,289,513 | B1 | 9/2001 | Bentwich |
| 6,311,190 | B1 | 10/2001 | Bayer et al. |
| 2001/0049688 | A1 * | 12/2001 | Fratkina et al. .......... 707/104.1 |
| 2002/0016731 | A1 | 2/2002 | Kupersmit |
| 2002/0029154 | A1 | 3/2002 | Jaoor |
| 2002/0035486 | A1 | 3/2002 | Huyn et al. |
| 2002/0059283 | A1 | 5/2002 | Shapiro et al. |
| 2002/0065683 | A1 | 5/2002 | Pham et al. |
| 2002/0140731 | A1 | 10/2002 | Subramaniam et al. |
| 2003/0167197 | A1 | 9/2003 | Shoemaker et al. |

OTHER PUBLICATIONS

Neil, Stephanie, "Calling All Customer," PC Week, v15, n37, p63(1), Sep. 14, 1998, ISSN: 0740-1604, DialogWeb, pp. 1-5. (7 pgs.).

Kasahara, Kiyoshi, "CTI: Building Better Bridges to Customers," Teleconnect, v15, n3, pS8(6), Mar. 1997, ISSN: 0740-9354, DialogWeb, pp. 1-7, (8 pgs.).

PCT Notification of Transmittal of The International Search Report or The Declaration for PCT Counterpart Application No. PCT/US02/22279 Containing International Search Report (Mar. 3, 2003).

Stevens, Richard W., "Appendix A, Performance Measurements," UNIX Network Programming, Prentice Hall PTR, Saddle River, NJ 07458, 1999,457-459 (3 pgs.).

Supplementary European Search Report, European Patent Application No. EP02761095.5, (PCT/US0222279) mailed Sep. 23, 2005, (3 pgs.).

Mathew S. Malden, pending U.S. Patent Application entitled "Engine to Present A User Interface Based On A Logical Structure, Such As One For A Customer Relationship Management System," U.S. Appl. No. 10/118,538, filed Mar. 28, 2001, including Specification: pp. 1-39, and Drawings: Figures 1-11 on 11 sheets.

* cited by examiner

FIGURE 7

ENGINE TO PRESENT A USER INTERFACE BASED ON A LOGICAL STRUCTURE, SUCH AS ONE FOR A CUSTOMER RELATIONSHIP MANAGEMENT SYSTEM, ACROSS A WEB SITE

TECHNICAL FIELD

This disclosure relates generally to automated processing of information, and in particular but not exclusively, relates to an engine that can present a user interface based on a logical structure, such as a logical structure for a customer relationship management (CRM) system, across a web site.

BACKGROUND

Businesses are constantly trying to improve the services that they provide to their customers. Indeed, whether a business is successful is often dependent on the satisfaction of its customers. To better address the needs of their customers, businesses often provide "customer service departments." These customer service departments typically employ human individuals (sometimes referred to as "agents" or "representatives") who answer customers' questions, inquiries, complaints, or other sales and service issues. At a most basic form, an agent communicates with customers via a telephone to orally answer the sales/service inquires of customers who call the customer service department.

Customer relationship management (CRM) systems have become popular in recent years to automate the interaction between businesses and its customers. With the use of hardware and software, many of the tasks traditionally performed by agents can now be performed electronically. For instance, customers have become accustomed to automated voicemail systems (a form of CRM) where customers listen to prerecorded messages and then make menu selections using their telephone keypad.

Despite the increased use of CRM systems, they suffer from several implementation drawbacks. For instance, businesses, products, and customers can vary greatly from one situation to another. What works very well for one business may be completely useless to another. Given this consideration, CRM systems often need to be customized for each business. This customization can be expensive and lengthy, and often includes providing customized software code, customized hardware, customized applications, and the like to businesses.

Even with this customization, a system administrator of a business sometimes may still have to write software code to properly implement a CRM system, such as when modifying an existing feature, adding a feature, updating a component, initially installing the CRM system, or other activity. This limitation can cause delays in deployment of the CRM system or improper operation if the system administrator does not know how to write code, or is unfamiliar with the structure and user interfaces of the CRM system.

Other drawbacks of existing CRM systems are from a customer's perspective. Many types of CRM systems, such as the automated voicemail system identified above, progressively present menu selections to customers and then process the customers' responses. Should the customer hang up the telephone or should the communication be disconnected, then the customer usually has to redial the telephone number and start the process all over again. This can become exceedingly frustrating and inconvenient to the customer, particularly if much effort was previously spent to get to a certain point in the automated messages, and then the communication is prematurely terminated.

Some CRM systems try to implement customer service through a network, such as the Internet, in order to provide "self-service" to customers with minimal support from human agents. An example is an Internet web site that has web pages where a customer can get some degree of customer service by being presented with menu selections or questions in the form of hypertext links, or with forms where the customer can enter information such as name, addresses, product order, and the like. However, such web sites typically are very primitive and do not offer the degree of personalization that many customers would like to have. Furthermore, these web sites typically provide little or no interactive guidance on a workflow to perform a task, such as troubleshooting, form filling, personalized instructions, and the like. Also, these web sites suffer from the same "disconnection" limitation described above with regards to automated voicemail systems—if the customer's Internet connection is disconnected while the customer's inquiry is being processed, then the customer usually has to start over again.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 7 illustrates an embodiment of a user interface to view a status or control flow of a logical structure.

DETAILED DESCRIPTION OF THE ILLUSTRATED EMBODIMENTS

Figure 1:
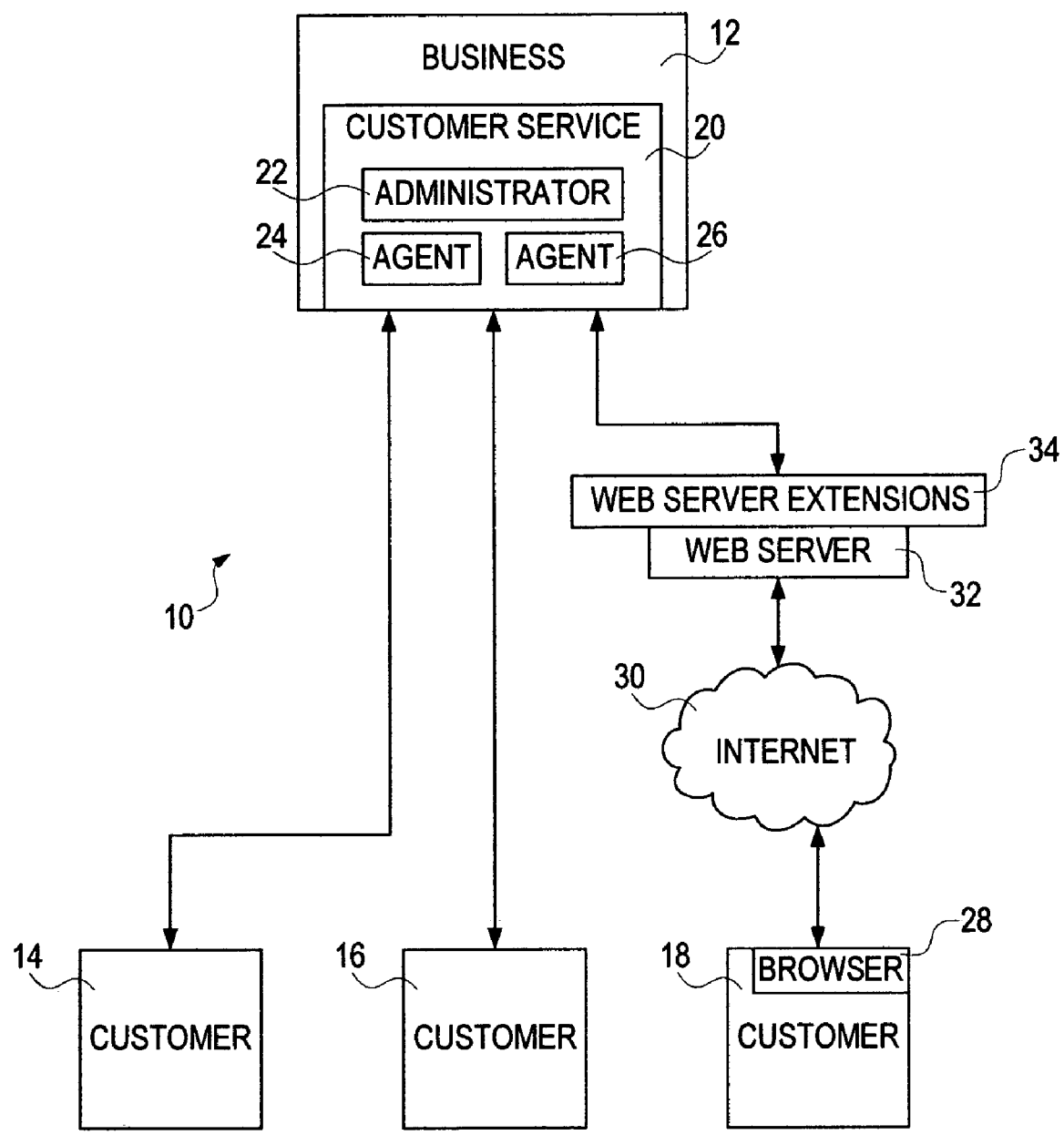
FIG. 1 is a block diagram of a system that can implement an embodiment of the invention.

Embodiments of an engine to present user interface based on a logical structure across a web site are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention uses a flowchart-based tool to allow an individual, such as a system administrator of a business, to build a logical structure. In the context of a CRM system, the logical structure can comprise an ordered set of questions and branching logic that are presented to a customer of the business when the customer contacts the business with an inquiry, such as for a sale or service inquiry or other interaction. A user interface can be presented to a customer or agent, with the user interface being based on a logical structure that includes a workflow to achieve a given task. The logical structure is tied to the user interface that is provided to the customer or agent. One embodiment of the flowchart-based tool uses a drag-and-drop interface to build the logical structure, and then questions for the individual components in the logical structure can be composed by the administrator or selected from menus.

After the logical structure has been created, an engine can run a session associated with the logical structure, with the session presenting questions, text, graphics, and the like dynamically to user. Branching logic determines the appropriate information to present to the user based on answers to previous questions. In one embodiment, the engine allows presentation of the information to the user/customer across a network, such as the Internet and a web site, by generating hypertext markup language (HTML) files to display the questions or other elements of the logical structure on a client terminal of the user. In another embodiment, the engine allows presentation of the information, such as questions or other elements of the logical structure, to an agent, who can then convey the questions to the customer in order to obtain answers from the customer that result in interactive progression through the logical structure.

The various features of the embodiments disclosed herein can be used in conjunction with the methods, systems, tools, and products disclosed in PCT Application Ser. No. PCT/US99/28415, entitled "SMART SCRIPTING CALL CENTERS," PCT Publication No. WO 00/33226, published Jun. 8, 2000, which claims priority based on U.S. application Ser. No. 60/110,187, filed Nov. 30, 1998, both of which are assigned to the same assignee as the present application and both of which are incorporated herein by reference in their entirety.

For simplicity of explanation, several terms that are used herein will now be clarified. It is understood that this terminology is being used for the sake of illustration and is not intended to strictly limit the scope of the invention. It is further understood that the components designated by these terms may be referred to differently in other embodiments using other terminology. The terminology used herein to describe an embodiment of the invention is as follows:

A Question represents a single interaction between a script and a customer/user. Questions may have answers and need not necessarily collect information. For instance, informative text that is presented to a user need not necessarily require a response from the user.

An Answer comprises a specific value defined for a question. Answers can be used to constrain user responses to questions, or to control navigation from a question.

A Script or Script Definition includes an ordered set of questions and the branches between them. Questions can be used in more than one script and can be associated with scripts through the branches. The script definition can also include an ordered set of pages and the branches between then. Each page can define branching within it, and branching may also be present between pages.

A Branch can be a link between one question and another question, or between one page and another page.

A Page comprises a set of questions, including branching, which can be used in one or more scripts. A page can be thought of as a "container" of questions, and scripts can be thought of as "containers" of pages.

Referring first to FIG. 1, shown generally at 10 is an example of a system that can implement an embodiment of the invention. The system 10 includes a business 12 and a plurality of end users or "customers" 14–18. The business 12 can have a "customer service" component 20 that operates to provide the customers 14–18 with different types of services and information, including accounting information, purchase/order information, product information, troubleshooting, and a multitude of other types of information and services that can vary according to the type of business conducted by the business 12. One example of the customer service component 20 is what is sometimes referred to as a "call center."

The customer service component 20 can be automated at least in part in an embodiment of the invention. This automation, as will be described in further detail below, can be performed by suitable CRM hardware and software. A system administrator 22 can configure and manage operation of the customer service component 20 using a flowchart-based embodiment of the invention. The customer service component 20 can also include one or more agents 24–26. The agents 24–26 can be human operators, in one embodiment, who address inquiries from the customers 14–18 using the CRM hardware and software. At least one of the agents 24–26 also can be fully automated, rather than human, to address inquiries from customers who electronically communicate with the customer service component 20, via a web site for instance (e.g., a "web user").

In one embodiment of the invention, the customer service component 20 can communicate with the customers 14–16 via a conventional communication medium, such as telephone. Other types of communication techniques that can be used for communication between the customer service component 20 and the customers 14–18 can include, but not be limited to, email, facsimile, instant messaging, voice-over-IP, and the like. For example, one embodiment of the invention allows the customer 18 to communicate with the customer service component 20 via a web browser 28 that is installed in the customer's 18 client terminal, such as a personal computer (PC), laptop, wireless device, or other communication device that can be communicatively coupled to an Internet 30.

The Internet 30 is in turn communicatively coupled to the customer service component 20 via a web server 32 and one or more web server extensions 34. In accordance with one embodiment of the invention, the web server extensions 34 operate to facilitate communication or otherwise interface with an object manager (not shown) of the customer service component 20 (or other application that is built into the architecture of the customer service component 20 behind the web server 32).

In an example operation of the system 10, the administrator 22 creates a logical structure, such as script definitions in a manner described below, using an embodiment of a flowchart-based technique. Once scripts have been defined, the customer service component 20 is ready to receive inquiries from the customers 14–18. If an inquiry is received from a particular customer, the agent 24 (or 26) launches a suitable one of the scripts and sequentially presents questions to that customer from the script, according to the order and relationships defined by the script definition. As the agent 24, using a user interface, enters answers given by that customer, subsequent questions (or pages or scripts as well) can be presented to the customer by the agent based on prior answers, until a final solution is reached.

For instance, if the customer 14 is calling to troubleshoot a product that was recently purchased, the agent 24 can initiate a script related to troubleshooting for that particular product. The initial questions in the script can include items such as the customer's 14 name and address, telephone number, model of the product that was purchased, and the like. Subsequent questions in the script can be orally communicated to the customer by the agent 24, in one embodiment, in order to obtain answers from the customer 14 with regards to the specifics of the problem that the customer 14 is having with the product. Finally, the script ends when a final question is reached.

In an embodiment, the customer 18 can run a script substantially without assistance from a human agent. In this embodiment, the customer 18 can run the script, to view questions and to provide answers, using the web browser 28 and other components of a web client embodiment for the customer service component 20. The same script may be run by multiple agents at the same time, or multiple users on the web site can run the same script at the same time.

FIGS. 2–6 illustrate embodiments of user interfaces of a flowchart-based tool that can be used in the system of FIG. 1 to build a logical structure, such as scripts or script definitions for a CRM implementation during a "design mode" of the flowchart-based tool. It is to be appreciated that in other embodiments of the invention, the flowchart-based tool may be used to build logical structures for other types of implementations, such as campaign programs, organizational charts, state models, business processes, and the like. For the sake of illustration, the user interfaces shown in FIGS. 2–6 will be described in the context of being used by the administrator 22 to build the logical structures, and it is understood that other individuals may also use the flowchart-based tool and related user interfaces alternatively or in addition to the administrator 22.

Figure 2:
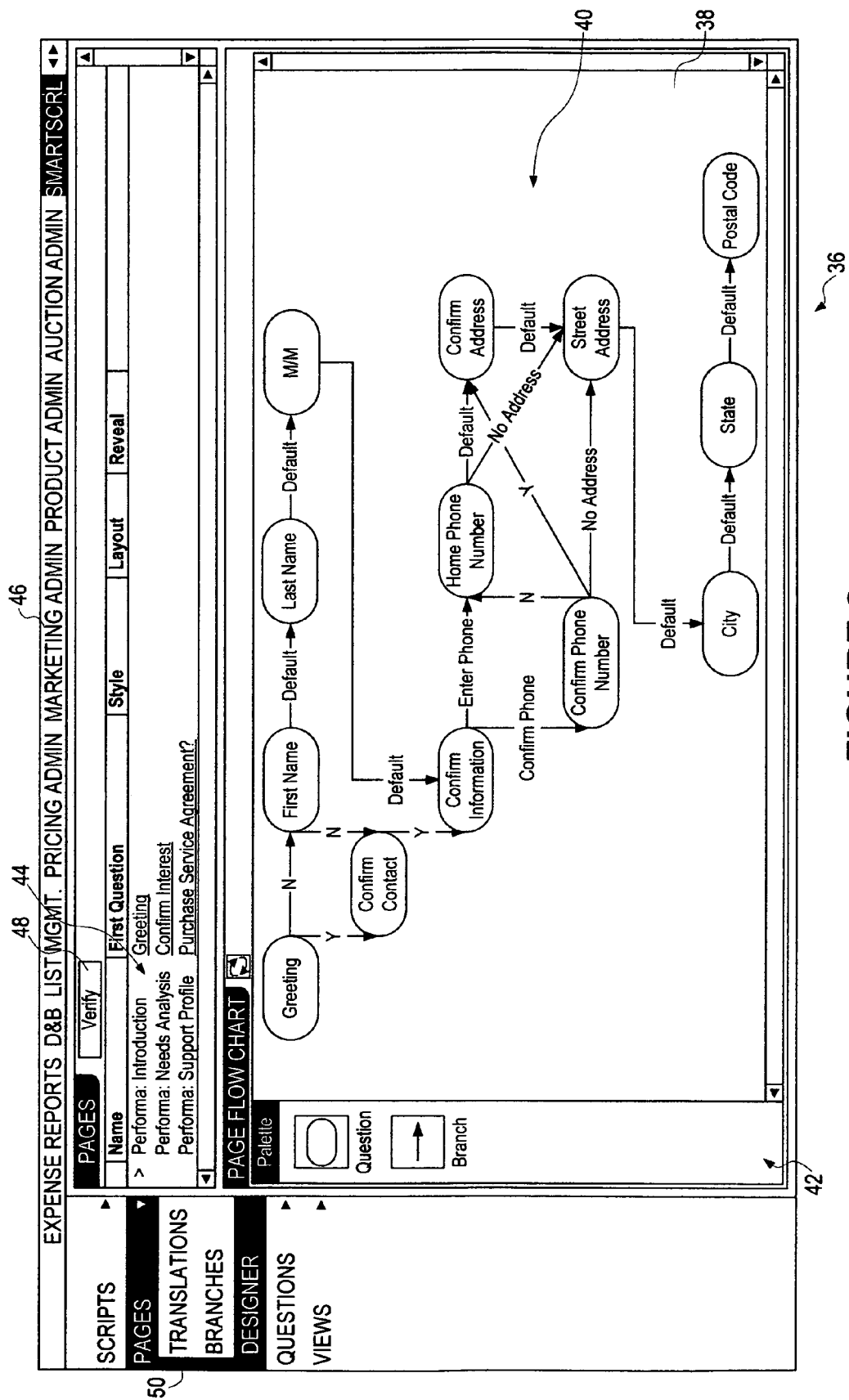
FIGS. 2–6 illustrate embodiments of user interfaces of a flowchart-based tool that can be used in the system of FIG. 1 to build a logical structure.

An embodiment of a user interface 36 is shown first in FIG. 2. The user interface 36 includes a display area 38, where a flowchart 40 may be created, edited/modified, displayed, and the like by the administrator 22. The user interface 36 may also include a plurality of palettes or templates 42. In the example shown in FIG. 2, the templates 42 include a question template and a branch template. In accordance with an embodiment of the invention, the flowchart 40 may be created using the question template and the branch template via a "drag-and-drop" technique, where the question template and/or the branch template are dragged and dropped into the display area 38 to build the objects or elements (e.g., question blocks and branches) of the flowchart 40. Thus in FIG. 2, the flowchart 40 comprises a plurality of questions that are logically linked together by branches.

Once placed on the display area 38, the administrator 22 can interactively move, resize, zoom, or reshape any of the objects of the flowchart 40 (or any flowchart displayed on the display area 38). A variety of other different manipulation features are possible, including cutting and pasting between pages or between files, layering, "snapping" to grid locations or other locations, and the like. In an embodiment, the various objects can have certain spots in them where the branches or other connectors can be attached. These spots can be visually indicated, by color for instance, to assist the administrator 22 in positioning the objects for connection, as well as having other visual indicators to identify that the objects have been connected. When moved, resized, or reshaped, the connected objects of the flowchart 40 can move in unison without separating and without the need for the administrator 22 to reconnect any of the objects. If elements of the flowchart 40 are moved or otherwise rearranged, information is stored in a database to reflect the new relationships/structure created by the rearrangement.

In the example of FIG. 2, the flowchart 40 comprises part of an "Introduction" page of a script. Additional pages of the script, such as "Needs Analysis" and "Support Profile" pages, can be displayed as part of a list 44, as the pages are created. Specific pages to display for revision or viewing can be selected from the list 44. Scripts themselves (operating as a container for pages) can be displayed at a menu bar 46 of the user interface 36. For instance, there can be separate scripts for expense reports, pricing administration, marketing administration, and the like, any of which can be selected in order to view, create, or revise their pages.

The user interface 36 can include a verify button 48. As will be described in further detail below, "clicking" on the verify button 48 triggers a verification process for the flowchart 40 to verify or test the proper operation of the flowchart 40. The user interface 36 can also include a translation feature 50. The translation feature 50 allows the administrator 22 to specify different foreign languages that may be used by a particular script when presenting questions or other information to the customers 14–18.

Figure 3:
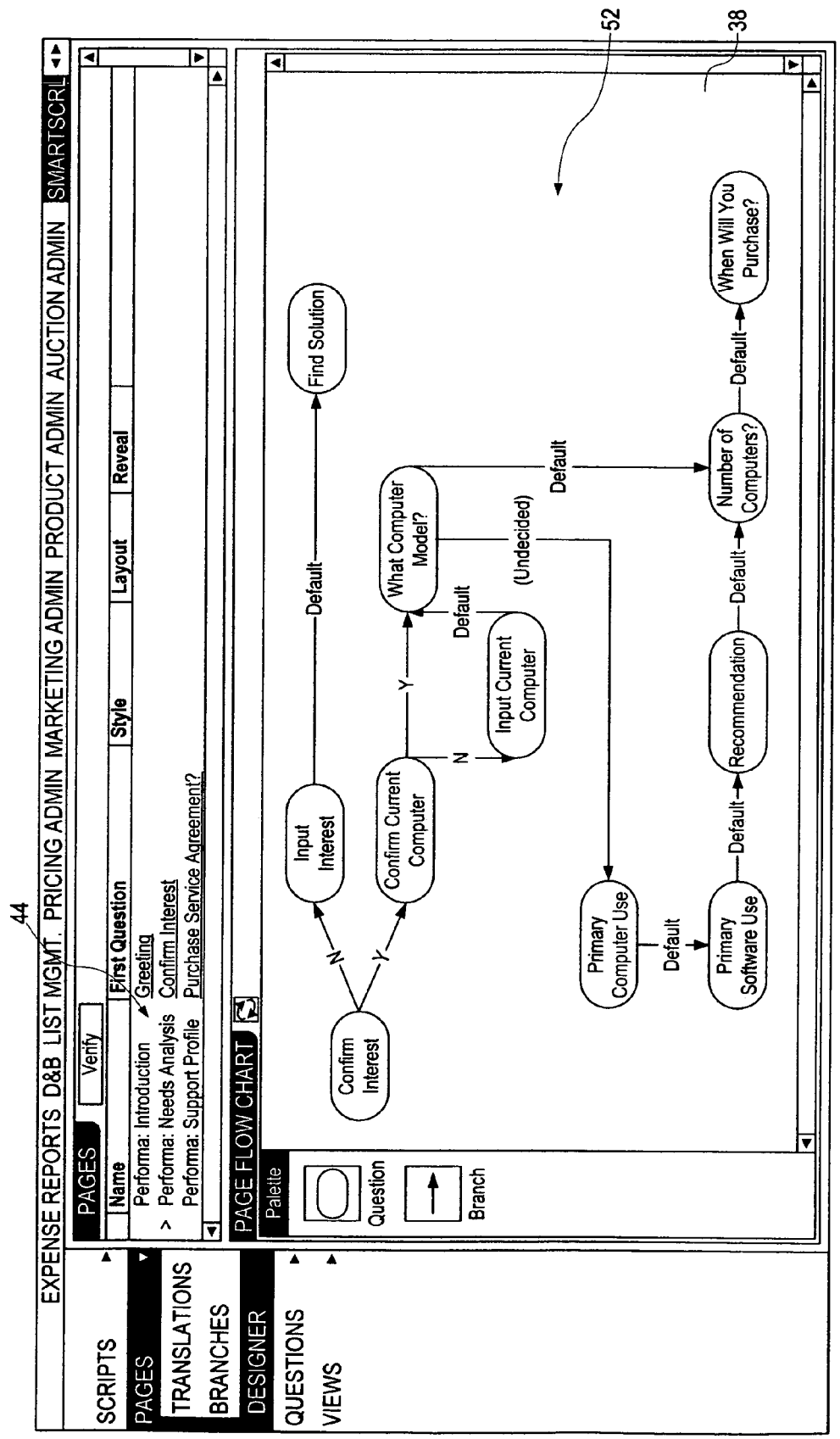

FIG. 3 shows another page of the script displayed in the display area 38 of the user interface 36. This page includes a flowchart 52 that corresponds to the "Needs Analysis" page selected from the list 44.

Figure 4:
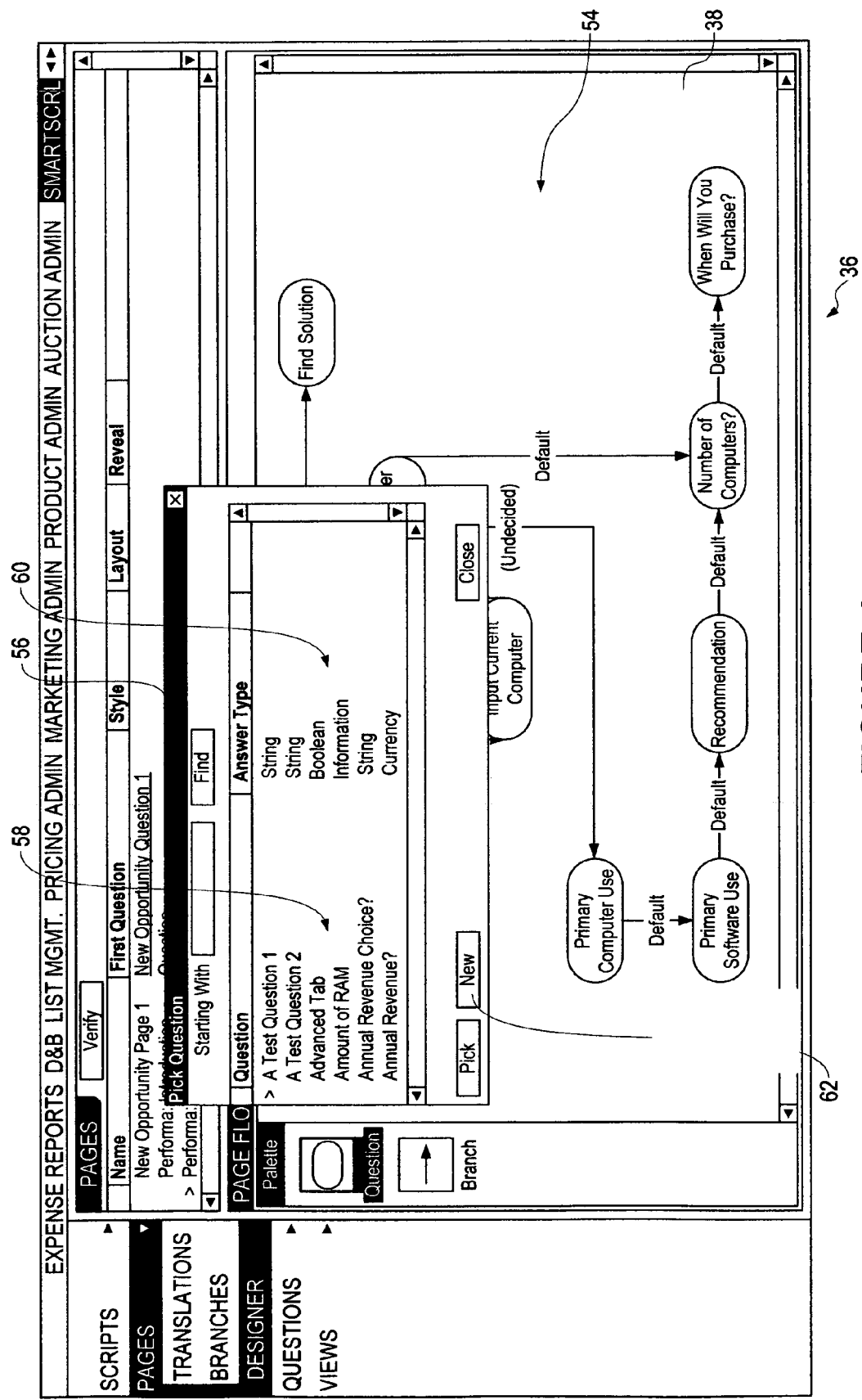

FIG. 4 illustrates how the administrator 22 may compose the questions themselves for any one of the objects in a particular flowchart 54 displayed in the display area 38. In accordance with one embodiment of the invention, a question selection box 56 (sometimes referred to as a "property" sheet having "attributes") may be displayed, with the selection boxes 56 providing the administrator 22 with different options as to the content of each question. The selection box 56 may be displayed, for instance, if the administrator 22 clicks on any one of the objects of the flowchart 54 that is displayed in the display area 38. A different selection box 56 can be displayed for each of the objects in the flowchart 54. The selection box 56 may also be displayed by selecting that feature from a menu or a tool bar. As another embodiment, the selection box 56 may be displayed automatically when the corresponding question object is dropped into the display area 38. As yet another embodiment, the questions can be created using a separate screen. When a question template is dragged and dropped on to the display area 38, the selection box 56 appears. The question selected by the administrator 22 can be created on the portion of the display area 38 where the question template was dropped.

In one embodiment, the selection box 56 can include a list 58 of pre-formulated questions. Such pre-formulated questions can be created by the manufacturer of the user interface 36 prior to shipment to the business 12, or created and saved by the administrator 22 during the course of building various flowcharts. For each of the questions in the list 58, answer types can be defined at 60. For instance, if a question is requesting an annual revenue amount, the corresponding answer type can be defined such that only currency values will be accepted as valid answers. Other examples of answer types include, but are not limited to, strings, Boolean, numerical, specific product information, and the like.

Alternatively or in addition to being able to select questions from the list 58, the selection box 56 allows the administrator 22 to compose entirely new questions through the use of a "New" button 62 or other component. By clicking on the button 62, a field (not shown) can be displayed where the administrator 22 can enter/compose a question.

Figure 5:
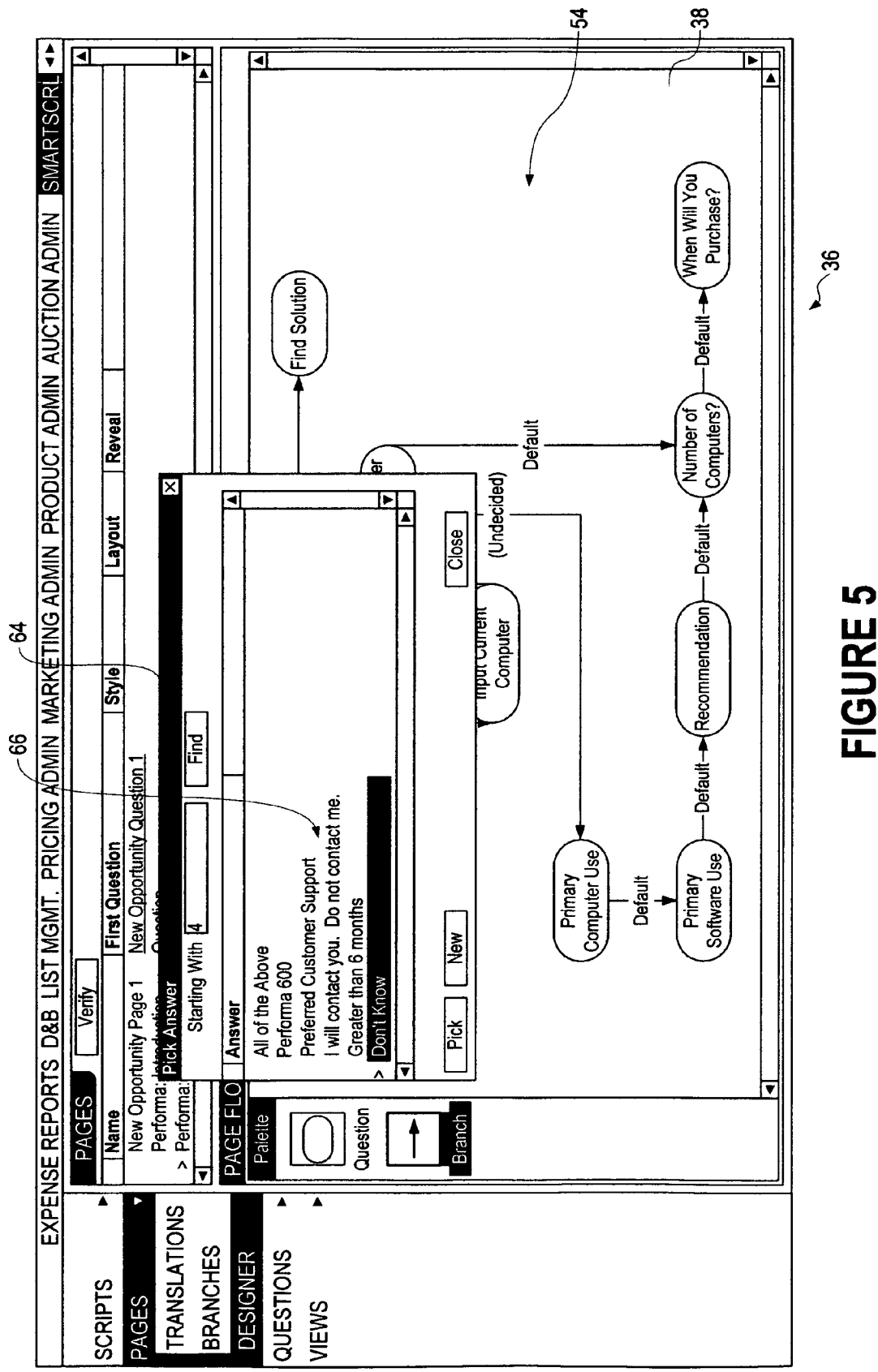

FIG. 5 illustrates an embodiment of an answer selection box 64. The selection box 64 may be displayed, for instance, when adding a branch for a question that has multiple defined answers. Thus, an answer can be selected from a list 66 of answers. In other embodiments, the selection box 64 can be used to compose entirely new answers different from the list 66, define answer types (e.g., strings, currency, Boolean, and the like), or otherwise define or compose answers if appropriate.

Figure 6:
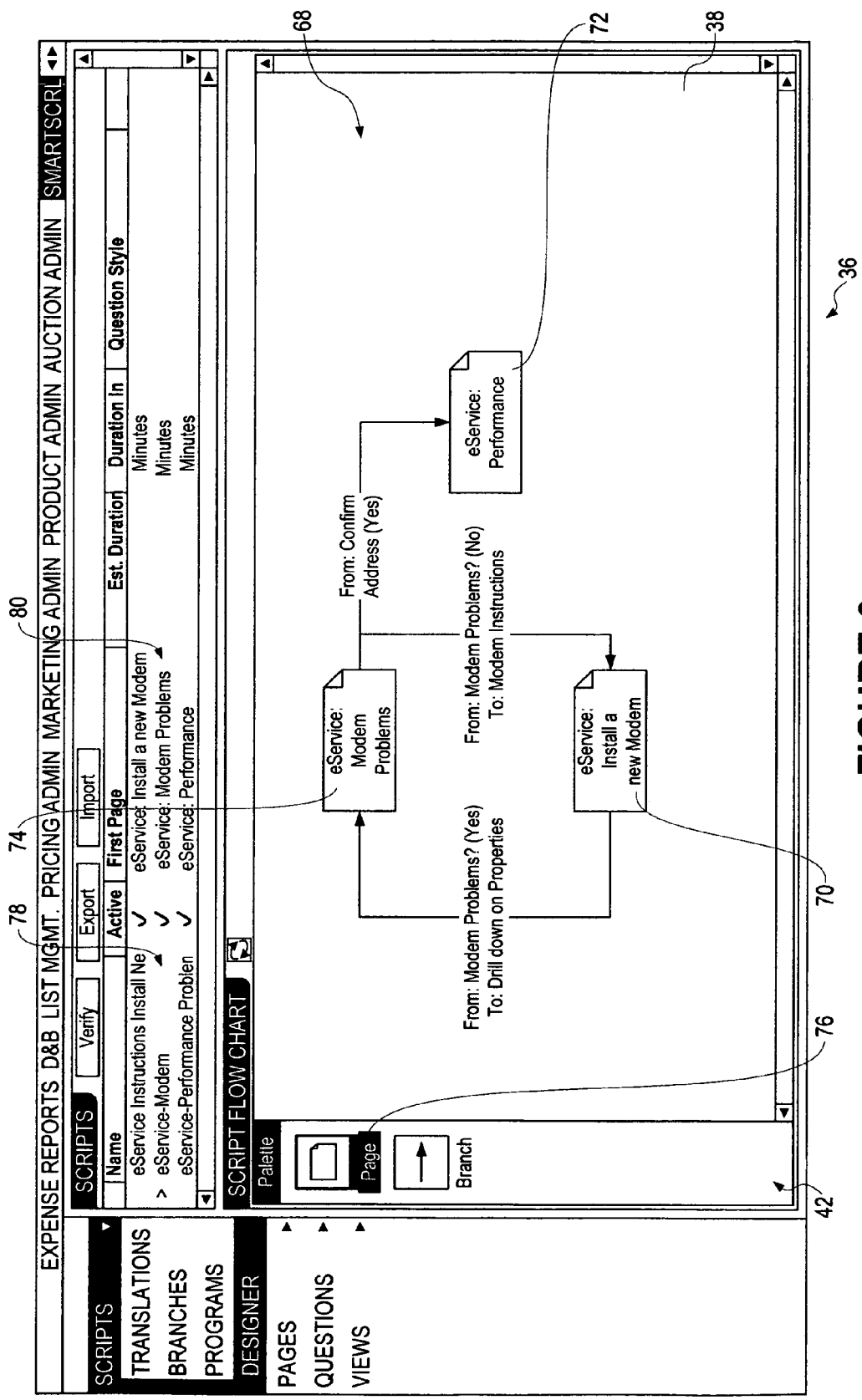

FIG. 6 illustrates use of the user interface 36 to build a flowchart 68 comprising pages and branches between pages. In particular, an embodiment of the invention allows the administrator 22 to provide branching from a question on a particular page to another question on another page, in effect linking pages together. Thus for the flowchart 68, questions in a page 74 can branch to questions in pages 72 and 70.

The templates 42 can include a page palette 76 that the administrator 22 can use in a drag-and-drop manner to build the flowchart 68. The specific pages to link can be chosen from a list 78. The specific questions to branch to (and from) may also be chosen from a list 80. In addition, it is possible to use or re-use the same page on multiple scripts.

Accordingly, as shown in FIGS. 2–6, the administrator 22 can create the script definitions using a flowchart-based tool during a design mode. The script definitions that can be created using the flowchart-based tools include, but are not limited to, the questions themselves, their ordering, their inter-relationships and branching (such as conditional branching that depend on previous answers), or other logical structure that define the flow of the script. Other parts of the script definition can include attributes such as language, run time, answer or question types, control settings, or other settings that can influence the flow and behavior of a script.

One embodiment of the user interface 36 allows the administrator 22 to create scripts that can be presented with different foreign languages. For instance, the administrator 22 may wish to design every script to begin with a greeting, such that the greeting is presented in the particular language of the ultimate recipient (e.g., the customers 14–18). This may be done in one embodiment by creating a language record for each element of the script definition. The administrator 22 can use the question selection box 56 of FIG. 4 or the answer selection box 64 of FIG. 5 to create foreign language translations for each question or answer, respectively.

The different foreign languages may then be assembled in a list and viewed when the translation feature 50 of FIG. 2 is clicked or otherwise activated. For instance, when the customer 14 calls the agent 14 and identifies himself/herself as a German-language speaker, the agent 14 can click on the translation feature 50 to select a German-language version of the script. Upon clicking of the translation feature 50, all of the German-language records for the elements in the script are loaded, such that when the script is run, German-language text appears in every piece of text that may be potentially seen by the end user.

Thus in one embodiment for an end-user user interface for choosing a script to run, the end user sees a list with two columns. One column is for the script name and another column is for the language. The same script can show up multiple times in the list (e.g., once for each language that it has a translation for). The end users select the script they wish to run from the list. For each language that is available for a script, a translation in that language can be defined for all question text, answer texts, page labels, script labels, or other characteristic that is suitable for a translation.

By creating language records that work in conjunction with a main record (e.g., the script definition), the entire script need not be re-written for every foreign language. Instead, the administrator need only create foreign language translation for certain pieces of text. The foreign language translations are then kept in language records and linked to the script definition, and subsequently loaded when the script is run.

Thus, as demonstrated by FIGS. 2–6, a logical structure can be created by the administrator 22 in one embodiment of the invention without the need to write code. The flowchart-based tool also allows the administrator 22 to conveniently revise or add to existing scripts without having to write or rewrite code. In an embodiment, revisions and additions can be performed simply by appropriately accessing and changing the flowcharts while in the design mode, using the palettes 42 and the selection boxes 56 and 64.

In accordance with an embodiment of the invention, script definition information is stored in a database as the various flowcharts in FIGS. 2–6 are created by the administrator 22. As an example, when a question object is dropped into the display area 38 and then connected to other question objects by branches, the user interface 36 (or other software or component) stores the corresponding script definition information in the database. The script definition information can include an identifier for the particular question object, an identifier for a question object from which it branches, an identifier for a question object to which it branches, the text of the question itself, the answer type, the page and script to which the question object belongs, the language of the question, its font or color, or other type of script definition information or information related to the various interrelationships of the objects. In an embodiment, each element of the script is stored in its own table. There can be tables for questions, pages, branches, answers, scripts, question translations, page translations, and the like. Using the new button 62 to create a new question causes a record to be created in the question table which contains question text and answer type. When two questions are connected by a branch using the flowchart-based tool, a branch record is created to represent the connection. The branch record can have a from question ID, an answer ID to represent on which answer this branch should be taken, a to question ID, and graphical properties for the questions it connects, such as font, color, and the like. Thus, use of the flowchart-based tool provides a convenient way to view the relationship between questions, for example, and manipulate them.

In an embodiment of the invention, this script definition information may be stored in rows and tables of the database. Alternatively or in addition, the script definition information may be stored as a file, such as a text file or binary file, in the same database or in another storage location, such as a file system. During a "run mode" (sometimes referred to as "run-time"), the script definition is loaded from this storage location(s) and executed according to the flow defined in the flowcharts, in a manner that will be described later below. During run-time, the agents 24 or 26 can display the flowcharts, in order to view the paths taken with the workflow or to see the current state of the process (e.g., where the inquiring customer is at in the flowchart).

Figure 7:
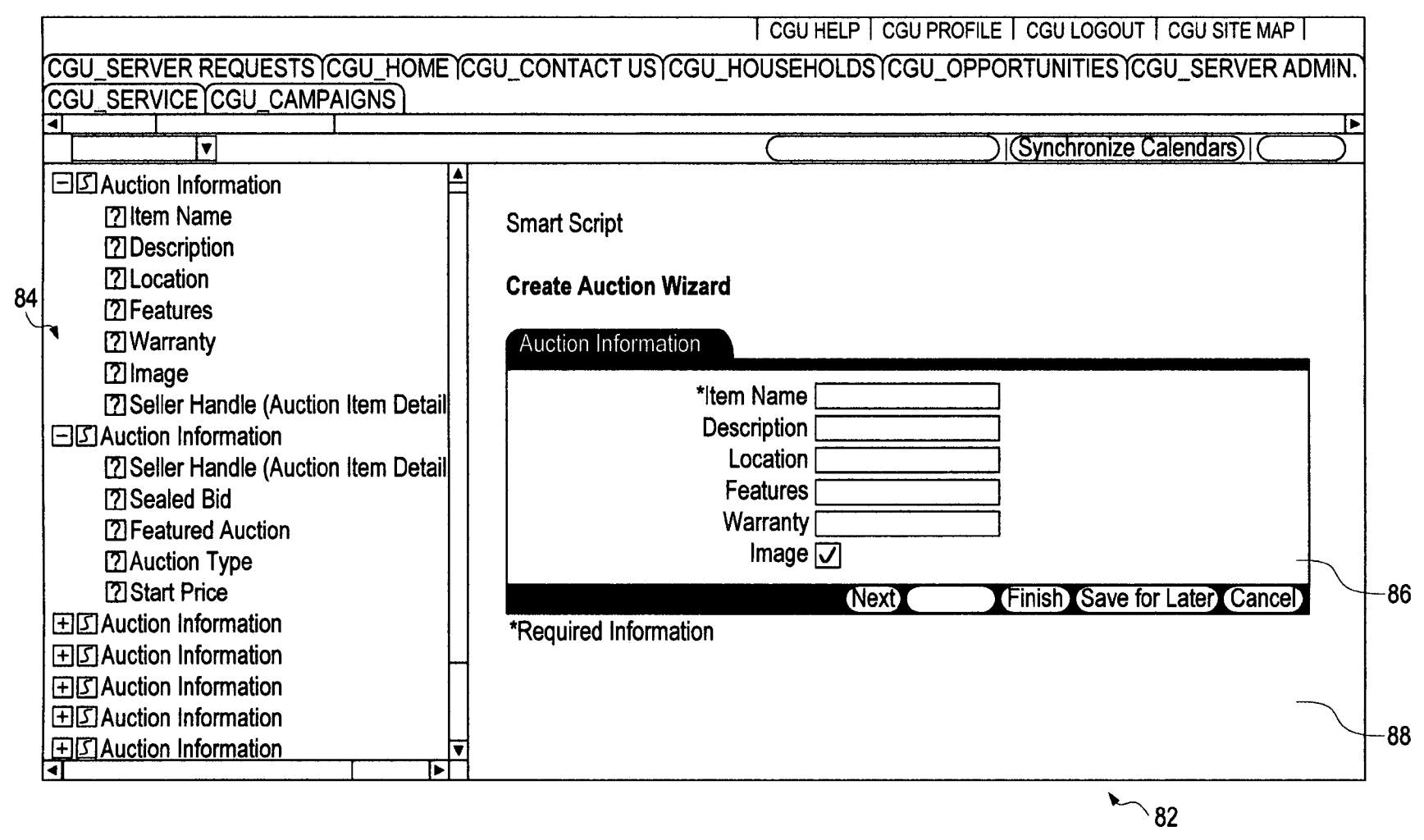

FIG. 7 illustrates an embodiment of a user interface 82 to view a status or control flow of a logical structure, such as one of the flowcharts created using the user interface 36 of FIGS. 2–6. The user interface 82 may be used by the administrator 22 and/or by the agents 24 or 26. In one embodiment, a web user, such as the customer 18, may use the user interface 82 via the web browser 28. The user interface 82 can provide a "tree control" feature or "tree structure" 84 that shows the logical structure of a particular script. Selecting any one of the elements in the tree structure 84, by clicking for instance, results in a display of the corresponding information 86 in a display area 88.

The user interface 82 can be used for a variety of purposes. It may be used to view any specific section of a script. It can also be used to "jump" from one location of a script to another location in the same script. This can be useful in situations where only a specific portion of a script may be of interest, while other portions are less necessary to the user. This feature may be used to allow the user to return to any previous portions of the script, without having to start over from the beginning of the script and without having to finish the entire script before being allowed to return to a previous portion. As such, the tree control feature 84 allows navigation to any portion of interest in the script to change prior answers, branch to different locations, review previous menu selections, and the like. The user interface 82 can be used for other types of viewing, data entry, modification, and navigation purposes.

One embodiment of the invention allows the administrator 22 to create scripts having dynamic and intelligent text that is based on previous answers. This includes text substitution to provide personalization to every script. For instance, if one of the first questions asks the customer 18 for his/her name, subsequent questions can include the name provided by the customer 18, thereby making the interaction between the script and the customer 18 appear personalized. It is to be appreciated that there are several ways to "personalize" the interaction, in addition to simply inserting the customer's 18 name in subsequent questions. Product names, account information, troubleshooting terms, or other information that are based on previous answers can be used for text substitution.

In one embodiment, the dynamic text substitution feature can be configured by the administrator 22 into a script when creating that script. One technique to accomplish this is for the administrator 22 to insert JavaScript™ or Visual Basic code into locations (e.g., at questions or branches) of a script where such dynamic text substitution is desired. During run-time, this code is activated or called to extract the customer's answers to previous questions (from memory, a database, or a data structure, for example), and then these answers are inserted into subsequent questions. In this manner the code interacts with the data to create intelligent text in subsequent questions. Another technique to accomplish text substitution is to make this feature part of the script definition. In this embodiment, answers to questions are saved under temporary variables as the answers are provided by the customer. The underlying script definition has a reference or link to the temporary variable(s). The values saved under the temporary variables are called during presentation of subsequent questions, and inserted into the appropriate textual locations in the questions.

For example in an embodiment, as part of the definition of a question, the administrator 22 can specify that the answer to that question be saved to a temporary variable of a given name. Other questions can be defined to display the value of a temporary variable by using the syntax [User.VariableName] in the question text. For example, question 1 can ask "What is your last name?" and be defined to save the answer to a variable called LastName. Then, the text for question 2 can be defined as "Hello [User.LastName]." An engine will automatically substitute the value of variable into the text before displaying it.

It is to be appreciated that an embodiment of the invention can allow selection of answers from database records or can allow saving of answers to database records, which can occur in one embodiment without having to insert code into the script to perform these operations. As described above, this may be performed via use of temporary variables as part of the script definition. In other embodiments, these may be performed independently by the agent or customer by retrieving the records from a database, and then using the retrieved records to provide answers to the relevant questions. It is further to be appreciated that scripts can be personalized to a customer based on answers provided by the user during the running of the script, or based on information known about the user or known to the agent prior to running the script.

In accordance with an embodiment of the invention, scripts that are built using the flowchart-based tool may be verified. This verification may be performed to check the structure of the script(s) for errors or corruption. The types of errors or corruption that can be detected include, but are not limited to, unreachable questions or pages, missing translations, no start question or page, missing questions or pages, and the like.

Figure 8:
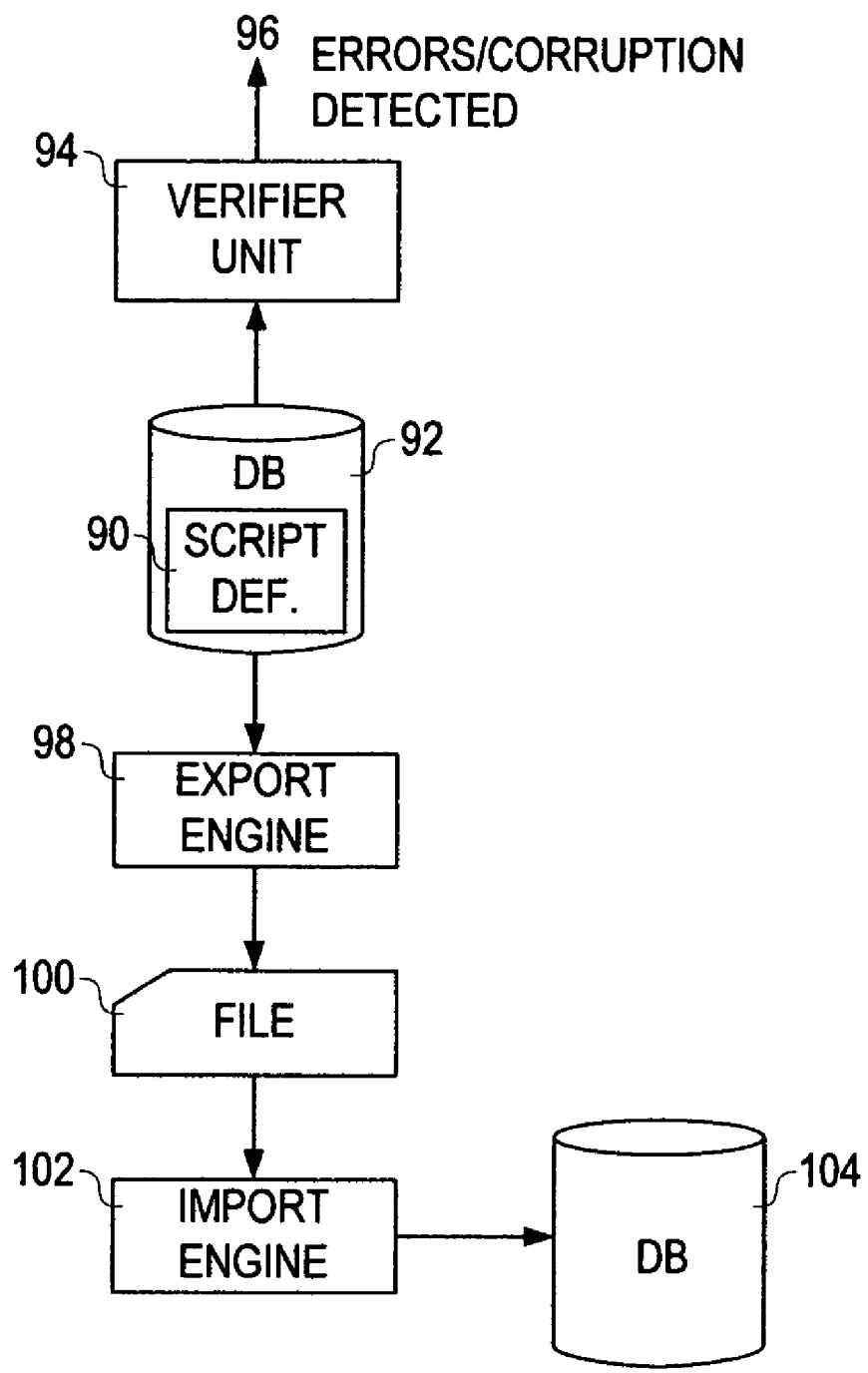
FIG. 8 is a functional block diagram illustrating verification and importing/exporting of a logical structure in accordance with an embodiment of the invention.

FIG. 8 is a functional block diagram illustrating verification of a script (or script definition). At least some of the elements of the block diagram of FIG. 8 may be located in the customer service component 20 of FIG. 1. A script definition 90 (e.g., script definition information) is stored in a database 92, in a manner described above when the flowchart-based tool is used to create the script definition 90. A verifier unit 94, which may be embodied in hardware or software or both, is coupled to the database 92. In operation in one embodiment when the verify button 48 of FIG. 1 is clicked, the verifier unit 94 extracts a copy or loads the script definition 90, and performs a verification routine on the script definition 90 to locate errors or corruption. If errors or corruption are detected by the verification unit 94, then error messages are generated at 96 for display on the user interface 36.

Several techniques are possible for the verification routine performed by the verifier unit 94. In one embodiment, predetermined answers can be provided to the questions in the script, such that all branches are tested with answers. Then, the process flow through the script is monitored to check if branching through the script operates as designed (e.g., the process flow is monitored to verify that the correct and expected "final questions" are reached at the end of the script). In an embodiment, a verification routine checks the fundamental structure of the script. For instance, the verification routine checks if all branches have a beginning and an ending point.

In accordance with an embodiment of the invention scripts (or script definitions) may be imported and exported. Such importing and exporting may be performed in connection with backing up script definitions, or transporting script definitions to another database or file system. This transporting allows different machines to access and use a particular script, where such machines may not otherwise have access to the script.

The functional block diagram of FIG. 8 illustrates the exporting and importing of the script definition 90 according to an embodiment of the invention. An export engine 98, which can be embodied in hardware or software or both, is coupled to the database 92 or to a file system. In operation, the export engine 98 loads or makes a copy of the script definition 90, and then compiles, saves, or converts the script definition 90 into a file 100. The file 100 can be a binary file, a text file, or other type of file according to various embodiments of the invention. The file 100 can be stored in memory or other storage location, such as random access memory (RAM), floppy disk, hard disk, tape drives, CD-ROM, or other machine-readable storage medium.

During importing, an import engine 102, which can be embodied in hardware or software or both, reads the file 100. The import engine 102 then generates new entries or records in a database 104, or generating another file having the script definition information and storing that file in a file system. The new records correspond to the file 100, and as such, comprise a copy of the original script definition 90.

Figure 9:
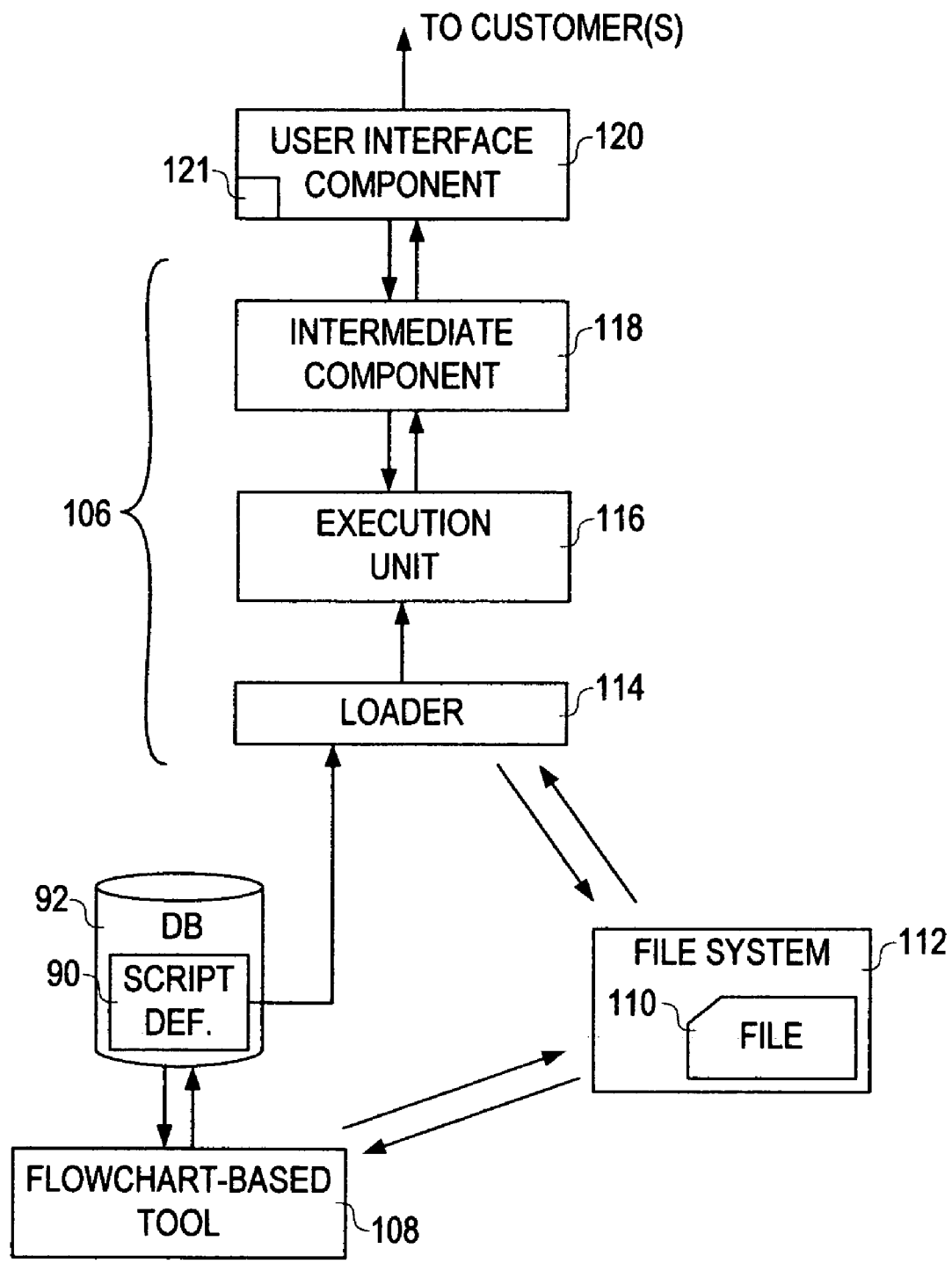
FIG. 9 is a functional block diagram illustrating an engine that can implement operation of a logical structure in accordance with an embodiment of the invention.

Shown next in FIG. 9 is a block diagram of an engine 106 that can implement operation of a logical structure in accordance with an embodiment of the invention. The engine 106, which can be embodied in hardware or software or both, allows presentation of questions (including text) dynamically to the user (e.g., agents or customers), where branching logic determines the questions (including text) to present based on previous answers. In one embodiment, the engine 106 can be used to present logical structures to the agent 22 (or 24), such that when the customer 14 (or 16) contacts the customer service component 20, the engine 106 can run the appropriate script for viewing by the agent 22, thereby allowing the agent 222 to ask the customer 14 the proper questions in the proper sequence.

As shown in FIG. 9, the engine 106 can be integrated to operate with other elements of the customer service component 20. A flowchart-based tool 108 (such as one that provides the user interface 36 of FIGS. 2–6) is used to create/edit/view the script definition 90, which is stored in fields of the database 92 as database records or entries. There may be a plurality of script definitions 90 based on the number of scripts created using the flowchart-based tool 108. Alternatively or in addition, script definition information can be stored as a file 110 in a file system 112. The file 110 can comprise a binary file, text file, or other type of file according to various embodiments of the invention. A loader 114 is coupled to the database 92 or the file system 112 to allow the loader 114 to load (or copy) the script definition 90 or the file 110, respectively, during run-time.

In operation during run-time, a particular script is first selected by one of the agents 24 or 26, for example. Selection of the specific script may be performed by using the user interface 36 (or other interface) to select the script from a list or menu, such as from the menu bar 46 of FIG. 2. Upon selection of the script, the loader 114 searches the database 92 for database entries that correspond to the selected script. This may be done, in one embodiment, by searching tables in the database 92 that have identifiers corresponding to the selected script. Alternatively or in addition, the loader 114 searches for one or more files 110 in the file system 112 that are correlated to the selected script.

Once the proper script definition 90 or file 110 has been located, the loader 114 loads the script definition information into memory, such as RAM. In one embodiment, the loader 114 loads all of the script definition information corresponding to the selected script (e.g., loads a copy or representation of the script or script definition information). In another embodiment, the loader 114 loads a portion of the script definition information (e.g., just enough information to initiate the script), and then loads the remainder of the script definition information on an as-needed basis as the script is progressively executed.

An embodiment of the invention has the ability to convert the definition to a compiled format for improving loading performance. A data model for this can include storing the different elements of a script into different tables. The definitions of all the elements are compiled into one large piece or block of data, and stored either in a separate table or into one file. Then, instead of loading the pieces separately, which can be slower since doing so uses many "round trips" to the database 92 or file system 112, a single "round trip" can be used to load in one large piece of data at once. Therefore, the loader 114 can load in the compiled definition if it exists. If one exists, the main script definition record points to the location of the file or the other record.

In one embodiment, the use of the loader 114 allows the script definition 90 (including questions, pages, branches, text, and other information related to the structure of the script) to be entered into a data structure. Once placed into the data structure, the data can be processed and manipulated from that location, without necessarily having to re-access the database 92 for the same information or changing the information stored therein. This results in improved speed and efficiency in executing and rendering the script, as well as protecting the underlying script definition 90 from inadvertent modification.

Once the script has been loaded by the loader 114, an execution unit 116 works in conjunction with an intermediate component 118 to render representations of portions of the script (such as questions, branches, and text) on a user interface component 120. Once displayed by the user interface component 120, the script can be presented (orally by telephone, for instance) by the agent 24 (or 26) to the customer 14 or other customer.

The user interface component 120 comprises part of a "presentation layer" for the customer service component 20, responsible for presenting the scripts for viewing by the agents 24 and 26 for the embodiment shown in FIG. 9. This presentation may be performed by an element 121 of the user interface component 120 that communicates with the intermediate component 118 to display data—the intermediate component 118 contains data that pertains to the current page that the user is seeing/working with, and the element 121 reads data from the intermediate component 118 and displays the data on the user interface 82 (or other user interface or screen). The element 121 can comprise a form, controls, or software implementation that can be configured to allow data entry, provide a scrolling control or table of records in the intermediate unit 118, display of graphics or navigation trees, or other user interface characteristic. In an embodiment, the element 121 can also provide pop-up windows, record selection capability, and modification capability for data in the intermediate component 118.

In one embodiment, the intermediate component 118 comprises a logical entity, such as a virtual database table(s), that associates columns from one or more tables into a single structure. Hence, questions or other components of a script definition can be field entries (e.g., columns) in the virtual database table(s) of the intermediate component 118. The intermediate component 118 provides, therefore, an additional layer over the database 92 so that the element 121 of the user interface component 120 references the virtual table(s) in the intermediate component 118 rather than the tables in the database 92. In addition, a question can map to a column in another table in the application. The answer to a question can be stored in the table column that it is mapped to when the user finishes the script. Also, the user interface component 120 can be thought of in one embodiment as a specialized user interface for a virtual table that displays a subset of the columns at a time. This can be thought of as displaying some of the questions at a time. It is to be appreciated that mapping a question to another table column is not required, in which case the answer is not saved to another table when the script is finished.

In an embodiment, the execution unit 116 comprises hardware (such as processors or controllers) that executes software (or calls functions) to read the script definition 90 that was loaded into memory by the loader 114. The software executed by the execution unit 116 (which can include function calls) then decides which questions to present based on the structure of the script and based on previous answers. The execution unit 116 interacts with the intermediate unit 118 to identify such questions for presentation and rendering by the user interface component 120. The intermediate component 118 can determine, in one embodiment, that only certain questions should be displayed and in what order. The intermediate component 118 then notifies the element 121 to represent the questions on the user interface component 120. Apart from displaying the question text, the element 121 can also result in the display of other user interface items associated with the questions, such as answer values and user input boxes (e.g., checkbox, number box, multi-line text box, and the like).

In an embodiment, the answers may be kept in an answer table in the execution unit 116 or at some other location different from the intermediate unit 118. In another embodiment, answers may be stored in the intermediate unit 118. The answers in the answer tables are linked to the virtual tables of the intermediate unit 118 so that the answers can be attributed to the questions in the virtual tables. This link to the answers allows the execution unit 116 to logically determine which questions to subsequently present when branches in the script are encountered.

In an embodiment, two kinds of elements may be involved during execution of a script. Command elements can be used to perform navigation like the "Next," "Previous," "Finish," or "Cancel" commands that save or cancel the script at any time in the execution of the script. The second type of element involves the user-input elements described above. For example, when a navigation button "Next" is used to proceed to the next step in the script, the answers on the current page is kept in an answer table or stored in a different location. Based on the answers chosen/entered for a user-input element and the branching logic defined on that element, the next set of questions to be presented subsequently are determined.

Figure 10:
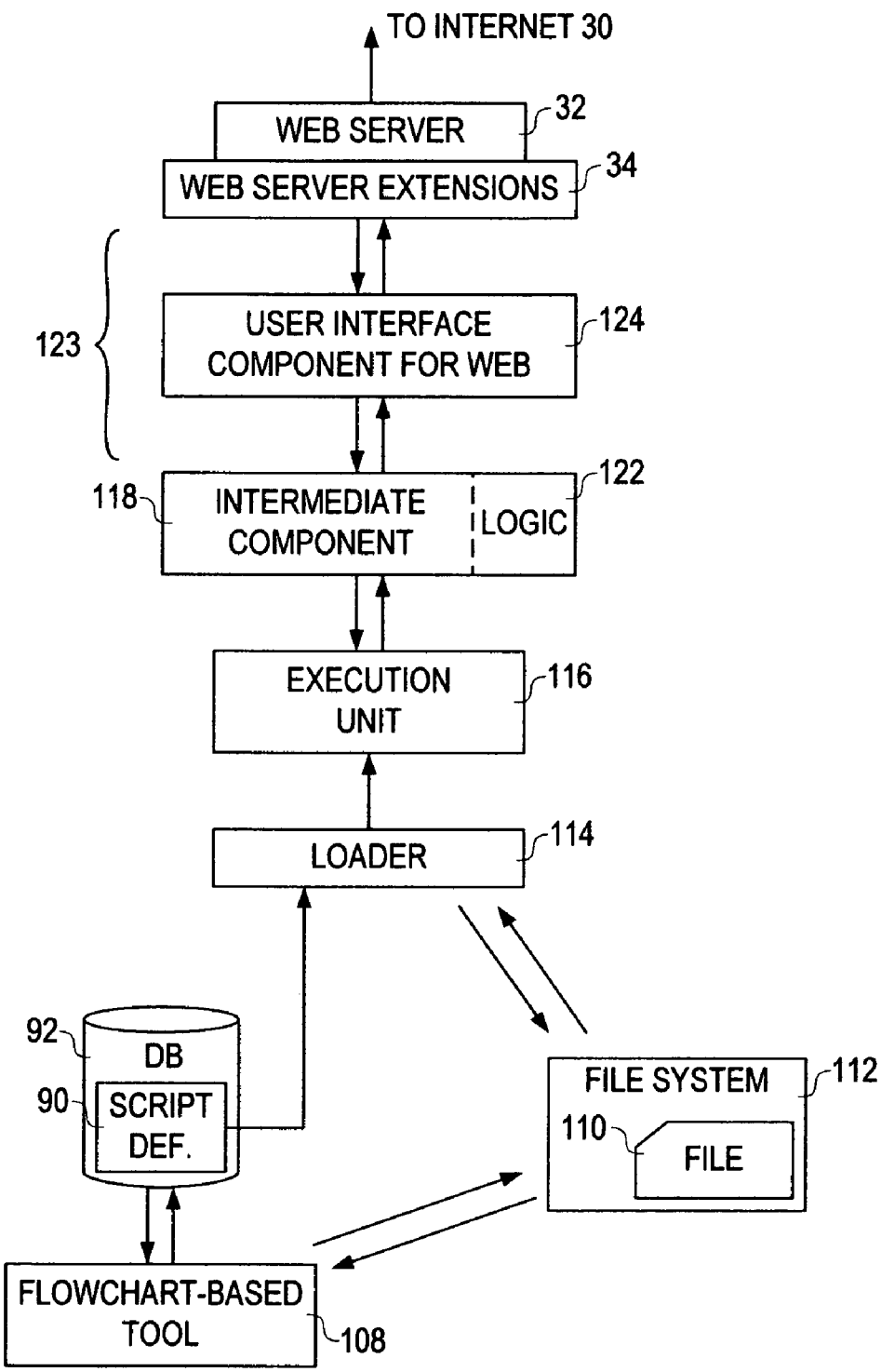
FIG. 10 is a functional block diagram illustrating an engine that can implement operation of a logical structure in accordance with another embodiment of the invention.

FIG. 9 illustrates an embodiment of the engine 106 that can be used to render scripts on display screens of the agents 24 and 26 when customers 14–16 contact the customer service component 20. FIG. 10 illustrates an embodiment of an engine 123 that can be implemented for web users, such as the customer 18, who use the browser 28 to access the web server 32 via the Internet. This web access allows the customer 18 to access, view, and run scripts using a protocol such as hypertext transfer protocol (HTTP), including obtaining hypertext markup language (HTML) files. Other protocols or formats may also be used, including but not limited to, file transfer protocol (FTP), transmission control protocol/Internet protocol (TCP/IP), extensible markup language (XML), and the like.

The embodiment shown in FIG. 10 has similarities with the embodiment shown in FIG. 9. The difference is that the engine 123 comprises a user interface component 124 that is usable for the Internet 30 or the "web." The user interface component 124 interacts with logic 122 in the intermediate component 118 to determine a maximum number of questions that can be provided for display to the browser 28. That is, since page refreshes are expensive and take a toll on system efficiency, the logic 122 includes a set of rules to determine an optimum number of questions to display at branches of any particular script. For instance, the engine 123 will try to show as many questions as possible to minimize the number of refreshes, and refreshes when moving on to the next section (e.g., when moving on to the next page). The engine 123 can also break a page when a question has multiple branches coming out of it, for instance.

In an embodiment, set of rules of the logic 122 as to when to present the next question includes the following, which results in presentation of the next question if all are true:

a) The current question only has one branch to another question. If it has more, the engine 123 waits until the user answers the current question. Then based on the answer, the engine 123 knows which branch to take and consequently which question should be displayed next.

b) The next question does not depend on the current or previous questions for text substitution. For example, if the next question substitutes the answer to the current question into its text, the next question is not presented until the user first answers the current question.

c) The next question is not on a different page. If the next question is on a different page, the engine 123 always causes a break.

In operation according to an embodiment of the invention, once the questions to display have been identified by the user interface component 124, the user interface component 124 generates an HTML file (or other file format suitable for transmission across a network), based on a standard XML-like template, with the template capable of being re-used to display questions across different scripts. The user interface component 124 then provides the HTML file to the web server 32 for eventual rendering of the corresponding questions by the browser 28.

Answers to questions are received from the browser 28 and stored in an answer table, which may be located at the intermediate component 118 or at a different location. These answers are used by the user interface component 124 and the logic 122 to determine subsequent questions to present for rendering by the browser 28. The subsequent questions are presented by generating another HTML file, and then the HTML file is sent to the browser 28, thereby resulting in the display of the questions. As described in the web user implementation, the questions to be displayed are determined by proceeding forward through the script, until a branch is detected. This improves performance over the non-web user implementation, where in one embodiment, the next question in the sequence is simply displayed.

In accordance with one embodiment of the invention, script sessions can be saved and then later resumed. This feature is useful, for example, if the interaction between the customer 14 and the agent 24 is stopped or interrupted for some reason. A script may stop, for instance, if the customer 14 does not have an answer to a particular question readily available, and so must "hang up" the telephone and then call back the agent 24 after the answer is found. The save and resume feature allows the current script session to be saved, such that the script session can be later resumed from where the previous session ended, without having to start all over again from the beginning of the script. The save and resume feature is also of use in situations where there is a disconnection between the customer 14 and the agent 24, such as if a system crash, power failure, or telephone disconnection occurs. Thus, the save and resume feature is useful if there is an Internet-connection disruption between the web user customer 18 and the customer service component 20. The Internet session can be saved and resumed once the connection is restored. The save and resume feature can also be used in situations where the browser 28 has been shut down by the customer 18.

Figure 11:
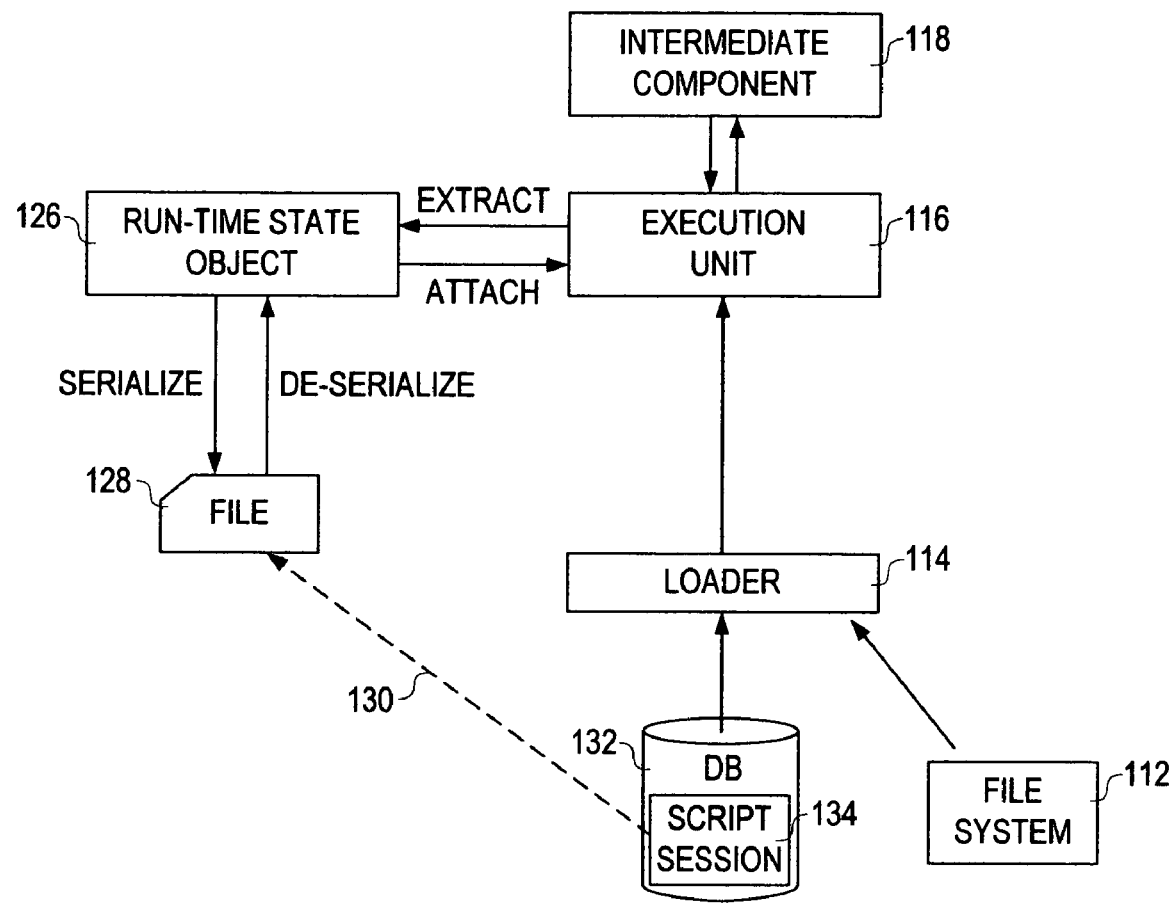
FIG. 11 is a functional block diagram illustrating an embodiment of a save and resume feature for a logical structure.

An embodiment of a save and resume feature is illustrated in FIG. 11. To initiate a save, a save button (not shown) on the user interface 36 or other user interface can be clicked. Upon clicking of the save button, a run-time state object 126 is created (or activated) that extracts run-time state information from the execution unit 116 or from some other location(s) where run-time state information may be kept, such as RAM, data structures, or databases. Run-time state information can include, but not be limited to, answers, current question, state of all questions, state of data saved in the intermediate component 118, user parameters that are set and changed as the script is run, values of temporary variables, information indicative of current location in a script, a history stack, and the like.

In an embodiment of the invention, the run-time state object 126 comprises a C++ object, having software or code to call functions, access/link to data structures, and the like. Accordingly, the run-time state object 126 can place the run-time state information that was extracted from the execution unit 116 into a data structure.

Next, the run-time state object 126 serializes the run-time state information that was extracted from execution unit 116. In an embodiment, this serialization comprises converting the run-time state information into a stream of bytes that represents the data structure, and then storing the bytes in a file 128 (which may include generating the file 128 itself). This serialization may be performed by having the run-time state object 126 call a function to serialize the run-time state information.

After creation of the file 128, a record is made in a table in a database 132 to point/link to or otherwise identify the location of the file 128, as shown symbolically by a broken line 130 in FIG. 11. The database 132 may be the same as the database 92 that includes the script definitions, or it may be a different database. The table having the record to point to the file 128 may be part of a script session table 134 in the database 132. The script session table 134 and the script definition may be stored in separate tables according to one embodiment. The script session table 134 stores information about executed scripts, such as time the script was run, who ran it, which script was run, and other script information that can be stored. The script session table 134 may have a child table that stores answers given to the questions. Saving the run-time state data as the file 128, rather than records in a table, results in fewer queries to load and store the values, and thus improves performance in terms of speed and efficiency.

In an embodiment, owner information may be included in the file 128 or in the script session table 134. The owner information may associate a particular agent 24 or 26 with a particular saved script. During a resume, such owner information can be used to retrieve the appropriate script for the agent 24 or 26 who saved it previously. Alternatively or in addition, the owner information can be changed during a resume to transfer the script from one agent to another (or from one web user customer 18 to another). One embodiment allows for saving a plurality of session records. Each session record can have an owner ID to identify the person that ran the script. A menu can be provided that shows each person (e.g., agent or customer) all saved sessions that belong to that person. A person can transfer the saved session to some other person by changing the owner ID. Then, that other person can see the saved session in their menu and resume the script.

To initiate a resume, a "Saved Sessions" menu (not shown) in the user interface 36 (or other interface) can be accessed to select from a list of saved scripts. A resume button (not shown) can be clicked to resume a script selected from the Saved Sessions menu. On resuming, the loader 114 loads the script definition information (or data from the script session table 134) from the database 132, like before, as if starting a new script. Separately in an embodiment, a new run-time state object is created (or the same run-time state object 126 is used) that calls a function to de-serialize the file 128, such that a stream of bytes in the file 128 is restored into a data structure of the new run-time state object (or the run-time state object 126). The state stored in the data structure is then attached to the execution unit 116, such that the original run-time information is restored into the appropriate locations in the script definition that is loaded separately into the execution unit 116. In effect, this is somewhat analogous to loading the script definition, and then "filling it in" with run-time information that was separately obtained from the file 128.

As illustrated in FIG. 11 and described above, the run-time information and links to the script definition are saved, rather than saving the entire script and script session. This improves performance and efficiency, since smaller amounts of data are saved and later recalled. All script session information need not be saved in the database 132, and hence, the number of queries to the database 132 can be reduced.

The embodiment of the save and resume feature shown in FIG. 11 can work similarly whether it is the agent 24 who saves and resumes the script, or whether it is the web user customer 18. In the context of a web user, clicking on the save button or on the resume button triggers transmission of a corresponding command from the browser 28 to the customer service component 20. These commands instruct the execution unit 116 to perform the save or resume procedures described above. Other ways to trigger the save feature is if a disconnection is detected or if a script is "timed out," such as no user activity or action is detected after a predetermined period of time.

In conclusion, an embodiment of the invention provides a flowchart-based tool to build and subsequently manage a logical structure, such as a script. The flowchart-based tool provides a convenient tool to create the logical structure, substantially without the need to write code. The elements of the logical structure are linked to a database as script definition information. Accordingly, questions, answers, branches, and their various inter-relationships can be saved as part of the script definition information. A verification technique can be used to check the logical structure for errors and corruption.

During run-time, the script definition information is loaded, and an engine cooperates with an intermediate component and a user interface component to present questions according to the structure of the script definition. A tree control feature allows a user to move to or view different portions of the script, without having to start from the beginning of the script. A save and resume feature allows run-time state information of a script to be saved, and subsequently recalled to complete the script.

Several features of the various embodiments described above can be implemented in software, code, or other machine-readable instructions stored on a machine-readable medium. When executed by a processor or processors, these instructions effect the various operations described above, such as creation of the flowchart 40, navigation through a script using the tree structure 84, verification and importing/ exporting of a script, running of a script, and saving and resuming a script.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while FIGS. 2–7 show specific layouts of user interfaces, it is to be understood that such layouts are merely illustrative. The layouts can vary from one implementation to another based on various design and aesthetic considerations. Furthermore, while specific components are shown in FIGS. 8–11 and described herein as performing various operations, it to be appreciated that embodiments can be provided where such operations are performed by other components. Additionally, several of the operations described herein may be performed by a single one of the components in an embodiment, as opposed to being performed separately by different components.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computer-implemented method, comprising:
   loading a logical structure from a database, components of the logical structure comprising a logically linked set of questions to be presented to a user as part of a customer relationship management user interface;
   associating components of the logical structure to an intermediate unit,
   based at least in part on the logic linking the set of questions, executing the logical structure to determine a presentation sequence of the components associated to the intermediate unit; and
   generating a file, representing the presentation sequence of the components, to transmit across a network to allow presentation of the components as part of a user interface on a client terminal.

2. The method of claim 1 wherein executing the logical structure to determine the presentation sequence of the components is further based at least in part on answers received from the client terminal.

3. The method of claim 2 wherein the answers received from the client terminal are stored in an answer table separate from the intermediate unit or in a database table.

4. The method of claim 1 wherein the intermediate unit comprises a logical entity having a virtual table, the virtual table capable to associate portions of the loaded definition to a single structure.

5. The method of claim 1 wherein the generated file comprises a hypertext markup language (HTML) file.

6. The method of claim 1 wherein executing the logical structure to determine the presentation sequence of the components includes interacting with a set of rules at the intermediate unit to determine a number of components, including questions at branches of the logical structure, to present on the client terminal.

7. The method of claim 1, further comprising:
   providing a first user interface component different from a second user interface component that generates the file to transmit across the network; and
   using an element of the first user interface component to interact with the intermediate component to present the sequence at the first user interface component or to allow other manipulation related to the executed logical structure.

8. An article of manufacture, comprising:
   a machine-readable medium having stored thereon instructions to:
   load a logical structure from a database, components of the logical structure comprising a logically linked set of questions to be presented to a user as part of a customer relationship management user interface;
   associate components of the logical structure to an intermediate unit,
   based at least in part on the logic linking the set of questions, execute the logical structure to determine a presentation sequence of the components associated to the intermediate unit; and
   generate a file, which represents the presentation sequence of the components, to transmit across a network to allow presentation of the components as part of a user interface on a client terminal.

9. The article of manufacture of claim 8 wherein the instructions to execute the logical structure to determine the presentation sequence of the components further includes instructions to determine the presentation sequence based at least in part on answers received from the client terminal.

10. The article of manufacture of claim 8 wherein the instructions to execute the logical structure to determine the presentation sequence of the components includes instructions to interact with a set of rules at the intermediate unit to determine a number of components, including questions at branches of the logical structure, to present on the client terminal.

11. The article of manufacture of claim 8 wherein the machine-readable medium further includes instructions stored thereon to use an element of a first user interface component to interact with the intermediate component to present the sequence at the first user interface component or to allow other manipulation related to the executed logical structure, the first user interface component being different from a second user interface component that generates the file to transmit across the network.

12. An apparatus, comprising:
   a loader to load a definition associated with a logical structure from a storage location, components of the logical structure comprising a set of questions to be presented to a user as part of a customer relationship management user interface;
   an intermediate unit to associate components of the logical structure to a logical entity of the intermediate unit, an execution unit coupled to the intermediate unit to execute the logical structure to determine a presentation sequence of the components associated to the intermediate unit, based at least in part on the loaded definition; and a user interface component coupled to the intermediate unit to generate a file, which represents the presentation sequence of the components, to transmit across a network to allow presentation of the components on a client terminal.

13. The apparatus of claim 12, further comprising an answer table or database table linked to the execution unit to store answers received from the client terminal in response to the presentation of the components, wherein presentation components of the logical structure is further based at least in part on the received answers.

14. The apparatus of claim 12 wherein the intermediate unit includes a set of logical rules to determine a number of components, including questions at branches of the logical structure, to present on the client terminal.

15. The apparatus of claim 12 wherein the user interface component comprises a first user interface component, the apparatus further comprising a second user interface component having an element to interact with the intermediate component to present the sequence at the second user interface component or to allow other manipulation related to the executed logical structure.

16. The apparatus of claim 12 wherein the storage location comprises a database, the database having tables from which the definition is loaded by the loader.

17. The apparatus of claim 12 wherein the storage location comprises a file system, the file system capable to store a definition file having the definition, the loader capable to load the definition file stored in the file system.

18. The apparatus of claim 12 wherein the definition comprises a plurality of elements compiled into a single block of data stored in the storage location.

* * * * *